US009130712B2

(12) United States Patent
Blankenship et al.

(10) Patent No.: US 9,130,712 B2
(45) Date of Patent: Sep. 8, 2015

(54) PHYSICAL CHANNEL SEGMENTATION IN WIRELESS COMMUNICATION SYSTEM

(75) Inventors: T. Keith Blankenship, Kildeer, IL (US); Yufei W. Blankenship, Kildeer, IL (US); Brian K. Classon, Palatine, IL (US); Ajit Nimbalker, Arlington Heights, IL (US); Anthony R. Schooler, Bartlett, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 2311 days.

(21) Appl. No.: 12/040,436

(22) Filed: Feb. 29, 2008

(65) Prior Publication Data

US 2009/0219911 A1    Sep. 3, 2009

(51) Int. Cl.
| H04L 1/00 | (2006.01) |
| H04L 27/18 | (2006.01) |
| H04L 27/34 | (2006.01) |
| H04L 1/06 | (2006.01) |
| H04L 25/03 | (2006.01) |

(52) U.S. Cl.
CPC ............ *H04L 1/0042* (2013.01); *H04L 1/0047* (2013.01); *H04L 27/18* (2013.01); *H04L 27/34* (2013.01); *H04L 1/0067* (2013.01); *H04L 1/0656* (2013.01); *H04L 25/03171* (2013.01); *H04L 2001/0094* (2013.01)

(58) Field of Classification Search
None
See application file for complete search history.

(56) References Cited

U.S. PATENT DOCUMENTS

| 4,553,237 | A | * | 11/1985 | Nakamura | 714/778 |
| 5,144,304 | A | * | 9/1992 | McMahon et al. | 341/58 |
| 5,565,926 | A | * | 10/1996 | Bryan et al. | 375/240.01 |
| 6,661,849 | B1 | * | 12/2003 | Guo et al. | 375/261 |
| 7,480,236 | B2 | * | 1/2009 | Geile et al. | 370/208 |
| 7,643,448 | B2 | * | 1/2010 | Pedersen et al. | 370/329 |
| 7,920,884 | B2 | * | 4/2011 | Agrawal et al. | 455/516 |
| 8,379,738 | B2 | * | 2/2013 | Pi et al. | 375/260 |
| 2001/0017901 | A1 | * | 8/2001 | You et al. | 375/285 |
| 2001/0021229 | A1 | * | 9/2001 | Belaiche | 375/295 |
| 2003/0067905 | A1 | * | 4/2003 | Belaiche | 370/345 |
| 2003/0123409 | A1 | * | 7/2003 | Kwak et al. | 370/335 |
| 2006/0018279 | A1 | * | 1/2006 | Agrawal et al. | 370/330 |
| 2006/0176976 | A1 | * | 8/2006 | Pedersen et al. | 375/295 |
| 2007/0153733 | A1 | * | 7/2007 | Kim et al. | 370/329 |

(Continued)

OTHER PUBLICATIONS

3GPP TSG RAN1 #48bis R1-071438; St. Julians, Malta; Mar. 26-30, 2006; Agenda Item: 7.5; Source: Motorola Title: On Enabling Pipelining of Channel Coding Operations in LTE Document for: Discussion and Decision, 4 pages.
3GPP TSG RAN1 #49 R1-072140; Kobe, Japan; May 7-11, 2007; Agenda Item: 7.5 Source: Motorola Title: On Enabling Pipelining of Channel Coding Operations in LTE Document for: Discussion and Decision, 3 pages.

(Continued)

*Primary Examiner* — Alpus H Hsu
*Assistant Examiner* — Hooman Houshmand
(74) *Attorney, Agent, or Firm* — Faegre Baker Daniels LLP

(57) ABSTRACT

A wireless communication transmitter (200) configured to segment a transport block into C segments, encode each segment into a set of encoded bits, determine, for γ encoded segments, a subset of size $M_0'$ of encoded bits for each encoded segment and for C−γ encoded segments, a subset of size $M_1'$ of encoded bits for each encoded segment, wherein the subset sizes $M_0'$ and $M_1'$ differ at most by P bits, where P is a product of a modulation order and a number of transmission layers over which the transport block is transmitted. The selected subsets of encoded bits are concatenated and grouped to form modulation symbols of the modulation order.

20 Claims, 4 Drawing Sheets

(56) References Cited

U.S. PATENT DOCUMENTS

| | | |
|---|---|---|
| 2007/0287476 A1* | 12/2007 | Jeong et al. ............... 455/456.6 |
| 2008/0013486 A1* | 1/2008 | Chitrapu et al. ............. 370/329 |
| 2008/0090528 A1* | 4/2008 | Malladi ........................ 455/70 |
| 2008/0141103 A1* | 6/2008 | Miyazaki et al. ............. 714/801 |
| 2008/0163002 A1* | 7/2008 | Frederiksen .................. 714/37 |
| 2008/0192675 A1* | 8/2008 | Kim et al. .................... 370/320 |
| 2008/0205331 A1* | 8/2008 | Jeong et al. .................. 370/328 |
| 2008/0304468 A1* | 12/2008 | Sun .............................. 370/345 |
| 2009/0180461 A1* | 7/2009 | Song ............................ 370/345 |
| 2009/0238066 A1* | 9/2009 | Cheng .......................... 370/216 |
| 2009/0285193 A1* | 11/2009 | Kim et al. .................... 370/342 |
| 2010/0014504 A1* | 1/2010 | Sun et al. ..................... 370/345 |
| 2010/0027450 A1* | 2/2010 | Montojo et al. .............. 370/311 |
| 2010/0254331 A1* | 10/2010 | Kim et al. .................... 370/329 |
| 2011/0134904 A1* | 6/2011 | Rouquette-Leveil et al. 370/345 |

OTHER PUBLICATIONS

3GPP TSG RAN1 #49bis R1-072673; Orlando, USA; Jun. 25-29, 2007; Agenda Item: 7.5 Source: Motorola Title: RE Sizing for Turbo Code Block Segments Document for: Discussion and Decision, 4 pages.

3GPP TSG RAN1 #50 R1-073363; Athens, Greece; Aug. 20-24, 2007; Agenda Item: 7.3 Source: Motorola Title: RE Sizing for Turbo Code Block Segments Document for: Discussion and Decision, 4 pages.

3GPP TSG RAN1 #50bis R1-074030; Shanghai, China; Oct. 8-12, 2007; Agenda Item: 6.3 Source: Motorola Title: Physical Channel Segmentation Considering Multiple Antennas Document for: Discussion and Decision, 2 pages.

* cited by examiner

PHYSICAL CHANNEL SEGMENTATION IN WIRELESS COMMUNICATION SYSTEM

FIELD OF THE DISCLOSURE

The present disclosure relates generally to wireless communications and more particularly to physical channel segmentation in wireless communication systems and corresponding methods.

BACKGROUND

The physical layer of some wireless communication systems using forward error correction (FEC) coding must be able to transmit a wide variety of packet sizes. In order to bound the memory usage of the FEC decoder in such systems, it is known to break up or "segment" larger information packets into smaller "code block segments", which are encoded independently. When segmentation is used, there is a need for rules that determine the number of physical channel resources to assign to each code block segment. These rules are referred to here as "physical channel segmentation" rules.

In the High Speed Packet Access (HSPA) extension of the 3GPP Universal Mobile Telecommunications System (UMTS) protocol, the physical channel segmentation rule is applied after a step of concatenating all of the encoded code block segments. Therefore, the segmented physical channel resources are not directly identifiable with code block segments. This adversely affects the ability to pipeline the channel equalization and channel decoding in the receiver.

In the WiMAX protocol, the segmented physical channel resources are directly identifiable with code block segments. However, in WiMAX, the physical channel resources can be segmented to a granularity of 48 modulation symbols, and all code block segments must have exactly the same code rate. In systems like the developing Long Term Evolution (LTE) of the 3GPP UMTS protocol where the available physical channel resources change from frame-to-frame, a much more flexible solution with a finer granularity of segmented physical channel resources is required.

The various aspects, features and advantages of the present disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
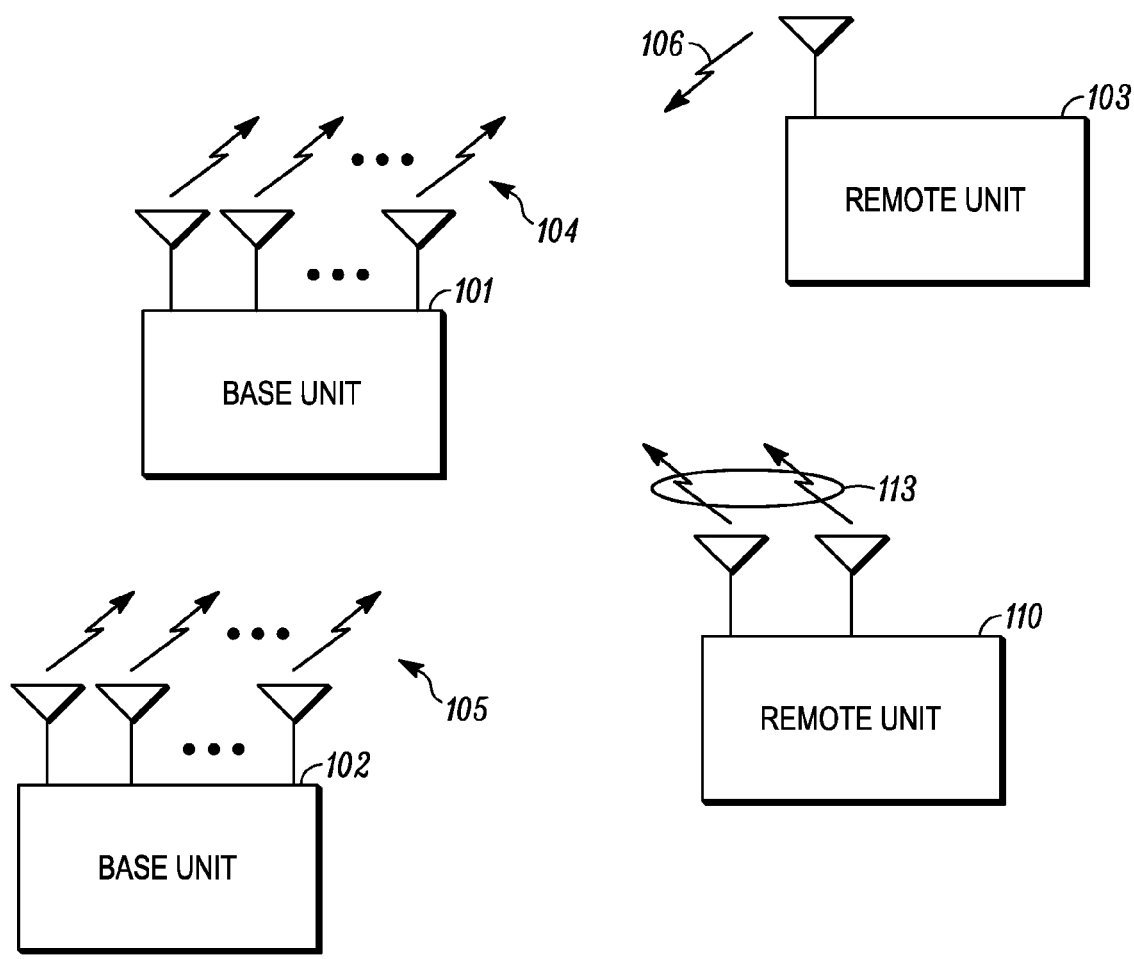
FIG. 1 is an illustrative wireless communication system.

In FIG. 1, a wireless communication system 100 comprises one or more fixed base infrastructure units forming a network distributed over a geographical region. The base unit may also be referred to as an access point, access terminal, Node-B, eNode-B or by other terminology used in the art. In FIG. 1, the one or more base units 101 and 102 serve a number of remote units 103 and 110 within a serving area, for example, a cell or a cell sector. The remote units may be fixed units or mobile terminals. The remote units may also be referred to as subscriber units, mobile stations, users, terminals, subscriber stations, user equipment (UE), terminals, or by other terminology used in the art. The instant disclosure however is not to be limited to any particular wireless communication system architecture.

Generally, the base units 101 and 102 transmit downlink communication signals 104 and 105 to serve remote units in the time and/or frequency domain. The remote units 103 and 110 communicate with the one or more base units via uplink communication signals 106 and 113. The one or more base units may comprise one or more transmitters and one or more receivers for downlink and uplink transmissions. The remote units may also comprise one or more transmitters and one or more receivers.

In one implementation, the wireless communication system is compliant with the developing Long Term Evolution (LTE) of the 3GPP Universal Mobile Telecommunications System (UMTS) protocol wherein the base station transmits using an orthogonal frequency division multiplexing (OFDM) modulation scheme on the downlink and the user terminals transmit on the uplink using a single carrier frequency division multiple access (SC-FDMA) scheme. More generally, however, the wireless communication system may implement some other open or proprietary communication protocol. The present disclosure is not intended to be limited to the implementation of any particular communication protocol.

In some system implementations using forward error correction (FEC) coding, the physical layer must be able to transmit a wide variety of packet sizes. In some systems, large information packets are divided or broken into smaller "code block segments" which may be encoded independently. The purpose of this is generally to bound the memory usage of the FEC decoder. Additionally, identifying a distinct set of physical channel resources for each code block segment facilitates pipelining of the channel equalization and FEC decoding in the receiver. Determining the number of physical channel resources to allot to each code block segment is referred to here as "physical channel segmentation." Assuming the same modulation order is applied to all code block segments, physical channel segmentation is equivalent to determining the number of encoded bits from each code block segment to transmit over the channel.

Figure 2:
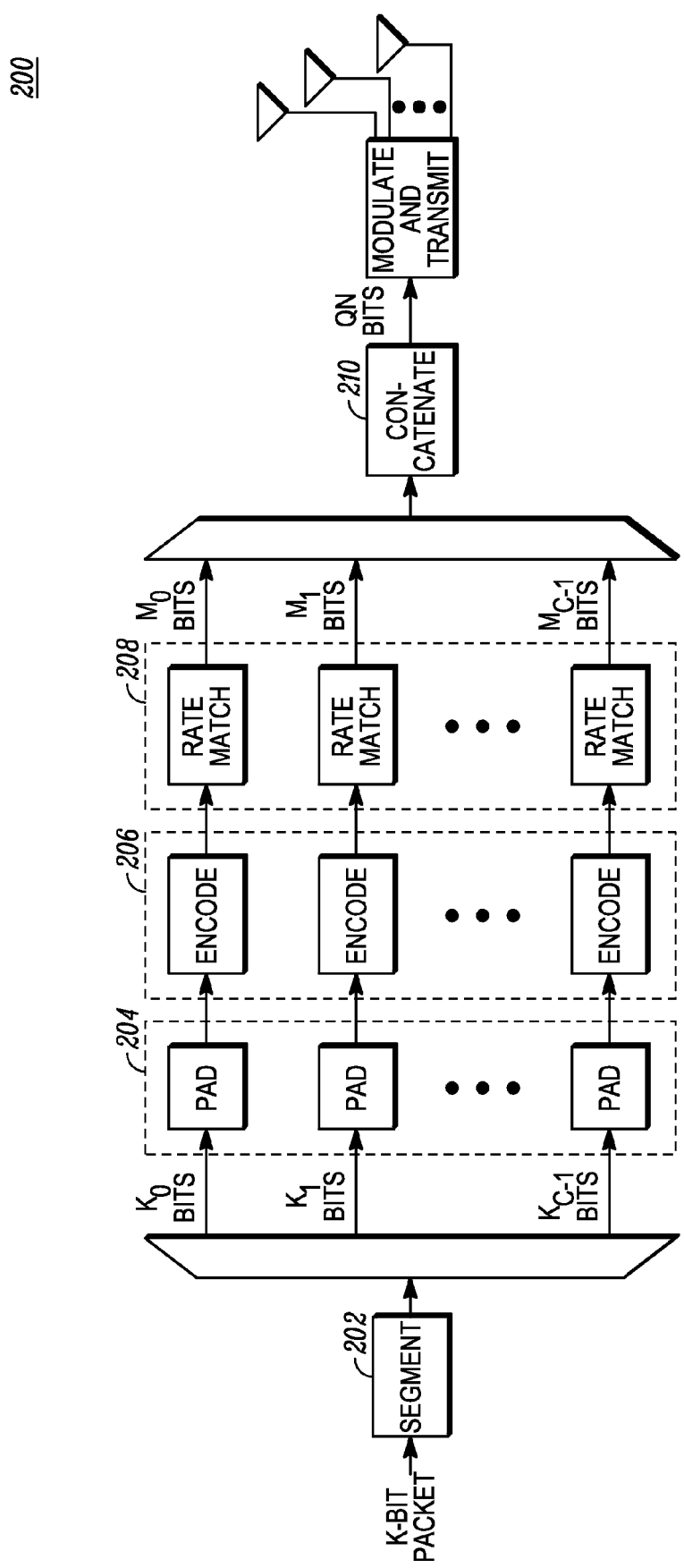
FIG. 2 is a block diagram of an exemplary wireless communication system transmitter.

FIG. 2 illustrates a wireless transmitter 200, which may be implemented as an infrastructure entity and/or a wireless terminal, for example, a mobile or fixed base subscriber. In FIG. 2, a K-bit information packet, or transport block, enters the transmitter for transmission over a channel. A segmenting entity 202 is configured to segment the transport block into segments. In one implementation, the segmenting entity is configured to segment the transport block such that at least two segments contain a common number of bits. More generally, the K-bit packet is segmented into C code block segments, where the i-th segment contains $K_i$ information bits, $0 \leq i < C$, and $$K = \sum_{i=0}^{C-1} K_i. \tag{1}$$

In FIG. 2, before channel encoding, in some embodiments, a padding entity 204 inserts a small number of bits, other than those in the information packet, into each code block segment. The bits may be inserted by pre-pending or by appending. For example, a code block segment may be padded by inserting 0's (called "zero padding") or by inserting some other pre-determined bit sequence so that the segment may be handled by the channel encoder. In another example, the padding entity attaches cyclic redundancy check (CRC) parity bits to each individual code block segment to provide error detection. Regardless of the types of bits inserted, the segment is regarded as being a padded code block segment or a padded sequence. Not all transmitter implementations include bit padding.

In FIG. 2, an encoding entity is configured to encode each segment into a set of encoded bits. After individually encoding the padded code block segments, a rate matching entity 208 individually rate matches the encoded bits for each segment to select subsets of the encoded bits to transmit over the channel.

In FIG. 2, a total of N complex modulation symbols are available to transmit the information packet over the channel, where each modulation symbol is selected by a group of Q encoded bits. For instance, Q=2, 4, or 6 for QPSK, 16-QAM, or 64-QAM modulation, respectively. Thus, a total of QN encoded bits may be transmitted over the channel. A physical channel segmentation rule determines the number $M_i$ of encoded bits for the i-th code block segment, $0 \leq i < C$, to transmit over the channel such that $$QN = \sum_{i=0}^{C-1} M_i. \quad (2)$$

In some embodiments of FIG. 2 there may be only two distinct sizes of the $M_i$ encoded bits, $0 \leq i < C$. For instance, for $\gamma$ segments we may have $M_0 = M_1 = \ldots = M_{\gamma-1} = M_0'$, and for the remaining C-$\gamma$ segments we may have $M_\gamma = M_{\gamma+1} = \ldots = M_{C-1} = M_1'$. Further, in some embodiments the difference between $M_0'$ and $M_1'$ may be either Q or the product of Q and the number of transmission layers over which the packet is transmitted.

In FIG. 2, a concatenating entity 210 is configured to concatenate the selected subsets of encoded bits after rate matching. The transmitter also includes a grouping entity configured to group the concatenated selected subsets of encoded bits in order to form modulation symbols of the modulation order and a transmitter entity 212 configured to transmit the modulation symbols, possibly making use of multiple transmit antennas. When multiple transmit antennas are used, multiple transmission layers may also be used to transmit the packet. The number of transmission layers is the effective number of non-redundant modulation symbols transmitted on the same time-frequency resource across multiple antennas. The number of layers over which the packet is transmitted must be less than or equal to the number of antennas over which the packet is transmitted.

Although FIG. 2 illustrates C padding, encoding, and rate matching steps, the illustration should not be construed as implying that these processing steps must occur in parallel. Alternatively, these steps, which are applied on a code block-by-code block basis, can be performed serially, one code block at a time.

Figure 3:
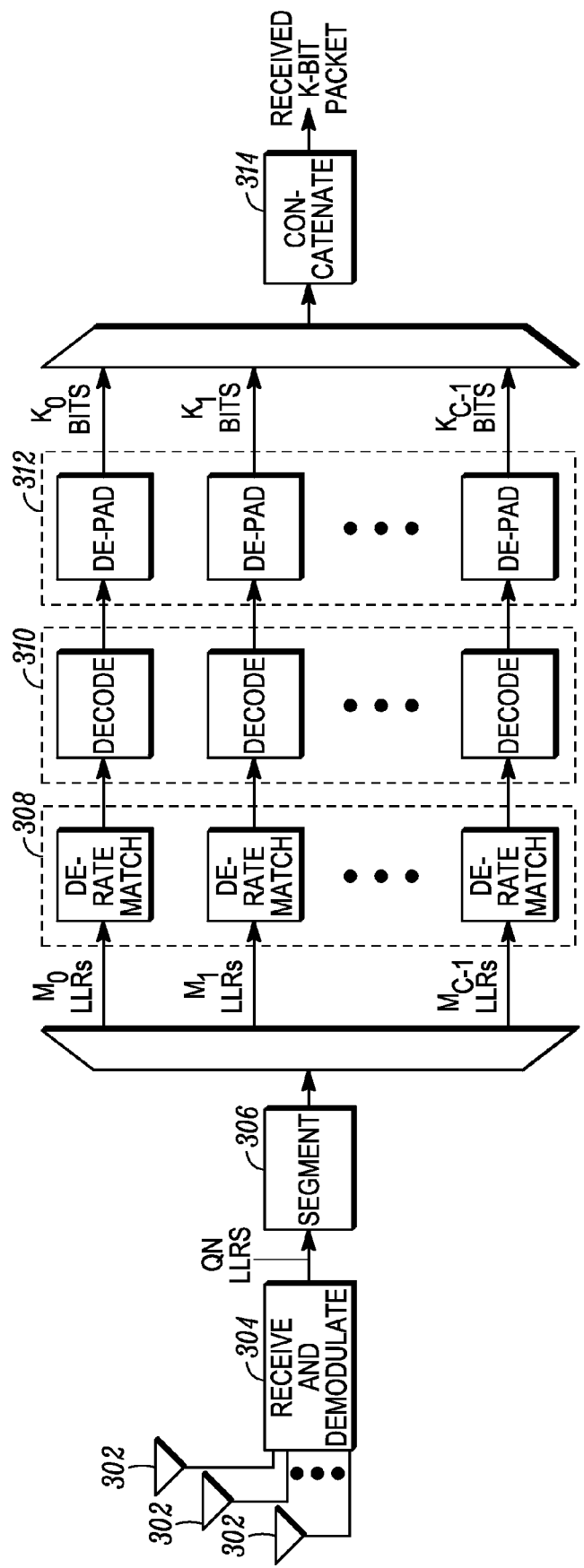
FIG. 3 is a block diagram of an exemplary wireless communication receiver.

FIG. 3 illustrates a wireless receiver 300 capable of processing a signal transmitted by the transmitter of FIG. 2. The receiver includes a number of antennas for receiving the signal and a demodulator entity 304 for demodulating the signal, which is demodulated to produce QN log-likelihood ratios (LLRs) for the received packet. The log-likelihood ratio of a bit b, $LLR_b$, may be defined as $$LLR_b = \log \frac{p(r|b=1)}{p(r|b=0)} \quad (3)$$

where b is one of the Q bits used to select the transmitted complex modulation symbol, r is the received complex modulation symbol, p(r|b=1) is the probability of receiving r given that b is 1, and p(r|b=0) is the probability of receiving r given that b is 0. Obeying the same physical channel segmentation rule used in the transmitter, the receiver includes a segmentation entity 306 that divides the QN LLRs into C segments, where the i-th segment, $0 \leq i < C$, contains $M_i$ LLRs. The C code block segments are each de-rate matched, decoded, and de-padded by a de-rate matching entity 308, a decoding entity 310 and a de-padding entity 312, respectively, to generate the received information bits, where the i-th segment, $0 \leq i < C$, contains $K_i$ bits. Thereafter, a concatenating entity 314 concatenates the segments.

FIG. 3 should not be construed as implying that the C de-rate matching, decoding, and de-padding steps must occur in parallel. FEC decoders, for example turbo decoders, often require large amounts of memory to store intermediate results, and the required memory size is proportional to the maximum code block size. Therefore, in some receiver embodiments, the de-rate matching, decoding, and de-padding steps are applied to the code block segments serially, one code block at a time.

The description above identifies two segmentation rules in a communication system. A code block segmentation rule is disclosed that determines the C segment sizes $K_i$ such that Equation (1) is satisfied. A physical channel segmentation rule is disclosed that divides the QN encoded bits available to transmit the packet into C segment sizes $M_i$ such that Equation (2) is satisfied. Assuming a given code block segmentation rule, this document addresses only the physical channel segmentation rule, two possibilities for which are presented below.

Figure 4:
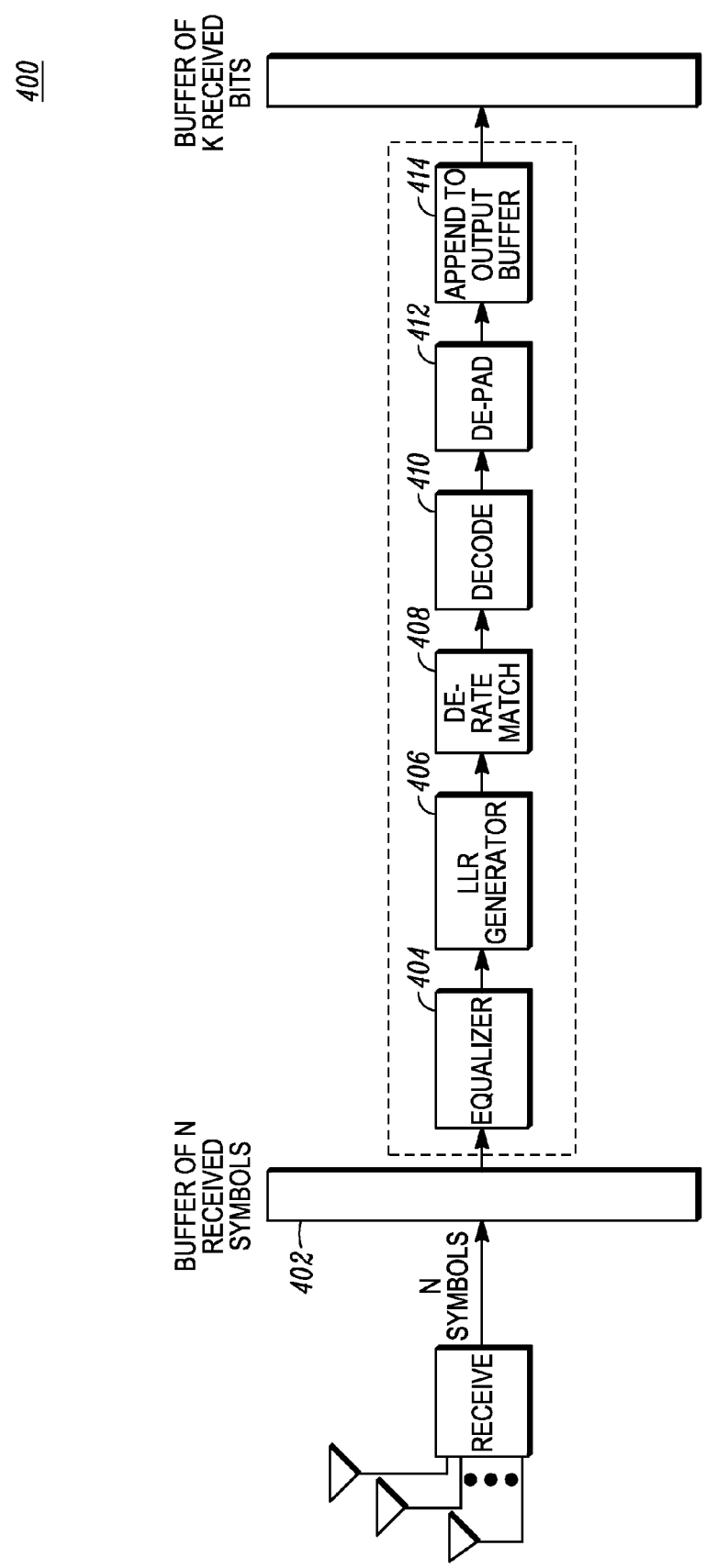
FIG. 4 is a wireless communication receiver for serially oriented segmentation processing.

FIG. 4 is a wireless communication receiver 400 for serially oriented segmentation processing. The receiver stores the N received complex modulation symbols for the information packet in a buffer 402, which typically is a random access memory (RAM). The code block segments are processed serially, i.e., one at a time, by first fetching the received symbols for the code block segment from the buffer and equalizing the fetched symbols at 404 to compensate for channel effects. LLRs are generated at 406 for all the bits of the received symbols. The generated LLRs are de-rate matched at 408, decoded at 410, and de-padded at 412, and the decoded information bits are appended to an output buffer 414. After the C code block segments have been so processed, the output buffer will contain the K received bits for the information packet.

A constraint that simplifies the receiver implementation of FIG. 4 is to require that the encoded bits of each code block occupy an integer number of modulation symbols. Symbolically, this requirement is equivalent to $$M_i \propto Q \quad (4)$$

for all i, $0 \leq i < C$. This constraint allows the equalizer to read an integer number of modulation symbols from the symbol buffer, generate LLRs for all bits of the symbols, and pass all generated LLRs directly to the decoder. Since there is no possibility that a modulation symbol would contain encoded bits from two different code block segments, there is no need for special handling procedures by the equalizer.

When multiple antennas are used at the transmitter, the particular signaling used might require the equalizer to fetch and compensate for channel effects over more than one received symbol. For instance, consider Alamouti-style space-time block coding with two transmit antennas and two receive antennas. In this transmission technique, the transmitter space-time encodes two symbols at a time, i.e., four channel uses are used to transmit two symbols, and hence the equalizer of FIG. 4 must fetch and process two received symbols (in addition to two redundant symbols) at a time to compensate for channel effects. In this example, the number of transmission layers is also two. A result of this equalization processes may be that all LLRs for two modulation symbols are generated in parallel. In this case, to eliminate the possibility that the LLRs generated in parallel contain encoded bits for different code block segments, thereby simplifying the equalizer design, it is necessary to require that the code block segments contain an even number of modulation symbols. Multiple-input multiple-output (MIMO) transmission presents similar cases where the receiver equalizes and generates all LLRs for multiple symbols in parallel.

In general, let the number of symbols the equalizer must process in parallel be an integer L. Then the equalizer design can be simplified by requiring $$\frac{M_i}{Q} \propto L \quad (5)$$

for all i, $0 \leq i < C$. In some systems, L may be equal to the number of transmission "layers" used to transmit an information packet, thus L may be directly referred to as the number of transmission layers. For example, for 3GPP LTE, when layer mapping for spatial multiplexing is used, up to 4 total number of transmission layers may exist, up to two transport blocks may be sent in parallel, and the number of transmission layers for one transport block may be L=1 or L=2. For 3GPP LTE where layer mapping for transmit diversity is used, only one transport block is sent over the multiple transmit antennas, and the number of transmission layers for one transport block may be L=2 or L=4. To correctly decode the information packet, the value of L may be communicated on a control channel. For example, the value of L may be determined via a field in a control channel message, or by decoding the control channel message and determining that a first message type is present instead of a potential second message type. Typical values of L are 1, 2, and 4. Thus L is a variable in the physical channel segmentation rule. While L is fixed for a given information packet, it may change from packet to packet.

One approach to physical channel segmentation is to divide the N available modulation symbols approximately evenly among the code block segments. Since C may not divide N evenly, this is referred to here as an "equal-size" rule, the quotation marks denoting the approximate nature of the rule. Symbolically, assuming N is a multiple of L and defining $N_L = N/L$, one possible equal-size rule is as follows:

$$M_i = \begin{cases} QL\left\lceil \frac{N_L}{C} \right\rceil, & 0 \leq i \leq N_L \bmod C - 1 \\ QL\left\lfloor \frac{N_L}{C} \right\rfloor, & N_L \bmod C \leq i \leq C - 1 \end{cases} \quad (6)$$

Equation (6) can also be written using the variable $\gamma = N_L \bmod C$ as follows:

$$M_i = \begin{cases} QL\left\lceil \frac{N_L}{C} \right\rceil, & 0 \leq i \leq \gamma - 1 \\ QL\left\lfloor \frac{N_L}{C} \right\rfloor, & \gamma \leq i \leq C - 1 \end{cases} \quad (7)$$

In equations (6) and (7), the rule assigns L extra modulation symbols to each of the first γ code block segments compared to the remaining C-γ code block segments. In another embodiment, the same rule can assign an extra modulation symbol to each of the last γ code block segments. Thus, the following is another embodiment of the "equal-size" rule.

$$M_i = \begin{cases} QL\left\lfloor \frac{N_L}{C} \right\rfloor, & 0 \leq i \leq C - \gamma - 1 \\ QL\left\lceil \frac{N_L}{C} \right\rceil, & C - \gamma \leq i \leq C - 1 \end{cases} \quad (8)$$

In another example, the γ code block segments with L extra modulation symbols may not be adjacent to each other. Thus in one implementation of the "equal-size" rule, the rate matching entity, for example, entity 208 in FIG. 2, is configured to determine, for γ encoded segments, a subset of size $M_0'$ of encoded bits for each encoded segment. The rate matching entity is also configured to determine, for C-γ encoded segments, a subset of size of $M_1'$ encoded bits for each encoded segment, wherein the subset sizes $M_0'$ and $M_1'$ differ at most by P bits, where P is a product of a modulation order and a number of transmission layers used to transmit the transport block. Generally, $M_0'$ and $M_1'$ are determined based on a total number of bits G=QN available for transmission of the transport block, wherein $\gamma = G/(Q \times L) \bmod C$, where Q denotes the modulation order and L denotes the number of transmission layers used to transmit the transport block. In one embodiment, the subset sizes $M_0'$ and $M_1'$ are both a multiple of the modulation order. In another embodiment, the subset sizes $M_0'$ and $M_1'$ are both a multiple of the number of transmission layers used to transmit the transport block. And in other embodiment, the subset sizes $M_0'$ and $M_1'$ are both a multiple of the product of the modulation order and the number of transmission layers used to transmit the transport block. Thereafter, the selected subsets of encoded bits are concatenated and then grouped to form modulation symbols of the modulation order.

Note that these "equal-size" rules satisfy the requirements in both Equations (4) and (5). Observe that with this rule, the code rate of the i-th segment, $R_i$, is $$R_i = \frac{K_i}{M_i} \quad (9)$$

Thus, when the code block segments are sized differently, i.e., $K_i$ is not constant for all i, and/or the encoded bits sent over the physical channel varies, i.e., $M_i$ is not constant for all i, the code rate may vary among the segments. A large variation in code rate among the code block segments could be detrimental to the link packet error rate.

Alternatively, if a system uses approximately equal code block segment sizes $K_i$, and approximately equal physical channel sizes $M_i$ shown in (6), then the code rates $R_i$ are approximately, although not exactly, equal among the segments. In such a case, the "equal-size" rule ensures approximately equal link error rate among the code block segments, and consequently good link error rate for the entire information packet.

Thus in one implementation of the "equal-size" rule, after segmenting the transport block into multiple segments and encoding each segment, a subset of encoded bits for each encoded segment is selected such that at least two segments have different resultant coding rates. The selection is based on a total number of bits G available for transmission of the transport block. In one embodiment, the size of the selected subsets of encoded bits for each encoded segment is a multiple of an order of modulation at which the selected subsets of encoded bits are modulated. In another embodiment, the size of the selected subsets of encoded bits for each encoded segment is a multiple of the number of transmission layers over which the transmission of the transport block occurs. And in yet another embodiment, the size of the selected subsets of encoded bits for each encoded segment is a multiple of the product of the modulation order and the number of transmission layers over which the transmission of the transport block occurs. Thereafter, the selected subsets of encoded bits are concatenated and then grouped to form modulation symbols of the modulation order.

Another approach to physical channel segmentation is to divide the N available modulation symbols in such a way that the code rate among all code block segments is approximately equal. An "equal-rate" rule may rectify performance problems introduced by an "equal-size" rule, but is not as simple. Note that a solution that achieves an identical code rate across all code blocks may not be possible.

One possible "equal-rate rule", assuming N is a multiple of L, that satisfies both Equations (4) and (5) allots $$M_i = \begin{cases} QL\left(\left\lfloor \frac{K_i M_*}{K_0} \right\rfloor + 1\right), & 0 \leq i < D \\ QL\left\lfloor \frac{K_i M_*}{K_0} \right\rfloor, & i \geq D \end{cases} \quad (10)$$

bits for segments $0 \leq i < C-1$, where $M_*$ is defined as $$M_* = \left\lfloor \frac{N_L}{\left\lfloor 1 + \sum_{i=1}^{C-1} (K_i/K_0) \right\rfloor} \right\rfloor \quad (11)$$

and the integer D is defined as $$D = N_L - \sum_{i=0}^{C-1} \left\lfloor \frac{M_* K_i}{K_0} \right\rfloor \quad (12)$$

The transmitters disclosed herein and particularly the segmentation, padding, encoding, rate matching, concatenating, grouping and modulation entities thereof, are typically implemented by a firmware controlled processor or DSP. The complementary entities in the receiver may be implemented similarly. Alternatively, these and other entities of the transmitter and receiver may be implemented as hardware equivalents and/or as a combination of hardware and software using discrete circuits or as an application specific integrated circuit (ASIC).

While the present disclosure and the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication transmitter, comprising:
    a segmenting entity configured to segment a transport block into C segments,
    an encoding entity configured to encode each segment into a set of encoded bits,
    a rate matching entity configured to determine, for γ encoded segments, a subset of size $M_0'$ of encoded bits for each encoded segment,
    the rate matching entity configured to determine, for C−γ encoded segments, a subset of size $M_1'$ of encoded bits for each encoded segment,
    the subset sizes $M_0'$ and $M_1'$ differ at most by P bits, where P is a product of a modulation order and a number of transmission layers for the transport block,
    a concatenating entity configured to concatenate the selected subsets of encoded bits, and
    a grouping entity configured to group the concatenated selected subsets of encoded bits in order to form modulation symbols of the modulation order.

2. The transmitter of claim 1 further comprising a transmitter entity configured to transmit the modulation symbols over the number of transmission layers.

3. The transmitter of claim 1, wherein the subset sizes $M_0'$ and $M_1'$ are both a multiple of the modulation order.

4. The transmitter of claim 1, wherein the subset sizes $M_0'$ and $M_1'$ are both a multiple of the number of transmission layers.

5. The transmitter of claim 1, wherein the subset sizes $M_0'$ and $M_1'$ are both a multiple of the product of the modulation order and the number of transmission layers.

6. The transmitter of claim 1,
    $M_0'$ and $M_1'$ based on a total number of bits G available for transmission of the transport block,
    wherein γ=G/(Q×L) mod C, where Q denotes the modulation order and L denotes the number of transmission layers.

7. The transmitter of claim 6, wherein L=1, 2, or 4.

8. The transmitter of claim 6, wherein Q=2, 4, or 6.

9. The transmitter of claim 1, the segmenting entity configured to segment the transport block such that at least two segments contain a common number of bits.

10. A method in a wireless communication transmitter, the method comprising:
    segmenting a transport block into C segments;
    encoding each segment into a set of encoded bits;
    for γ encoded segments, determining a subset of size $M_0'$ of encoded bits for each encoded segment,
    for C−γ encoded segments, determining a subset of size $M_1'$ of encoded bits for each encoded segment,
    the subset sizes $M_0'$ and $M_1'$ differ at most by P bits, where P is a product of a modulation order and a number of transmission layers for the transport block;
    concatenating the selected subsets of encoded bits; and
    grouping the concatenated selected subsets of encoded bits in order to form modulation symbols of the modulation order.

11. The method of claim 10 further comprising transmitting the modulation symbols over the number of transmission layers.

12. The method of claim 10, wherein the subset sizes $M_0'$ and $M_1'$ are both selected to be a multiple of the modulation order.

13. The method of claim 10, wherein the subset sizes $M_0'$ and $M_1'$ are both selected to be a multiple of the number of transmission layers.

14. The method of claim 10, wherein the subset sizes $M_0'$ and $M_1'$ are both selected to be a multiple of the product of the modulation order and the number of transmission layers.

15. The method of claim 10, the subsets of sizes $M_0'$ and $M_1'$ are selected based on a total number of bits G available for transmission of the transport block, wherein $\gamma = G/(Q \times L) \bmod C$, where Q denotes the modulation order and L denotes the number of transmission layers.

16. The method of claim 10, segmenting the transport block such that at least two segments contain same number of bits of the transport block.

17. A method in a wireless communication transmitter, the method comprising:

segmenting a transport block into multiple segments;

encoding each segment, each encoded segment having a set of encoded bits;

selecting a subset of encoded bits for each encoded segment such that at least two segments have different resultant coding rates, the selection based on a total number of bits available for transmission of the transport block;

concatenating the selected subsets of encoded bits; and grouping the concatenated selected subsets of encoded bits to form modulation symbols of the modulation order.

18. The method of claim 17, wherein the size of the selected subsets of encoded bits for each encoded segment is a multiple of an order of modulation at which the selected subsets of encoded bits are modulated.

19. The method of claim 17, wherein the size of the selected subsets of encoded bits for each encoded segment is a multiple of the number of transmission layers over which the transmission of the transport block occurs.

20. The method of claim 17, wherein the size of the selected subsets of encoded bits for each encoded segment is a multiple of the product of the modulation order and the number of transmission layers.

* * * * *